United States Patent
Zhang et al.

(10) Patent No.: US 12,128,351 B1
(45) Date of Patent: Oct. 29, 2024

(54) SKID-MOUNTED FLUE GAS INJECTION EQUIPMENT AND METHOD WITH ADJUSTABLE $CO_2$ ENRICHMENT DEGREE

(71) Applicant: China University of Petroleum, Shandong (CN)

(72) Inventors: Chao Zhang, Shandong (CN); Pengfei Li, Shandong (CN); Zhaomin Li, Shandong (CN); Hong Cheng, Shandong (CN); Binfei Li, Shandong (CN); Zihan Gu, Shandong (CN); Chao Yu, Shandong (CN); Dexin Zhang, Shandong (CN)

(73) Assignee: China University of Petroleum, Dongying (CN)

( * ) Notice: Subject to any disclaimer, the term of this patent is extended or adjusted under 35 U.S.C. 154(b) by 0 days.

(21) Appl. No.: 18/631,026

(22) Filed: Apr. 9, 2024

(30) Foreign Application Priority Data

Nov. 9, 2023 (CN) .......................... 202311484737.0

(51) Int. Cl.
*B01D 53/22* (2006.01)
*B01D 53/26* (2006.01)
(Continued)

(52) U.S. Cl.
CPC ......... *B01D 53/226* (2013.01); *B01D 53/229* (2013.01); *B01D 53/26* (2013.01);
(Continued)

(58) Field of Classification Search
CPC ................ B01D 53/226; B01D 53/229; B01D 2258/0283; B01D 53/26; B01D 53/30; B01D 2257/504; E21B 43/164
See application file for complete search history.

(56) References Cited

U.S. PATENT DOCUMENTS

2007/0272079 A1\* 11/2007 Malsam ................. B01D 71/44
96/7

FOREIGN PATENT DOCUMENTS

| CN | 105498455 A | 4/2016 |
| CN | 107575190 A | 1/2018 |
| CN | 112516757 A | 3/2021 |

OTHER PUBLICATIONS

First Office Action of counterpart Chinese Patent Application No. 202311484737.0 issued on Dec. 14, 2023.
(Continued)

*Primary Examiner* — Robert Clemente

(57) ABSTRACT

Skid-mounted flue gas injection equipment and method with an adjustable $CO_2$ enrichment degree are disclosed, and belongs to the technical field of experimental devices for oil and gas field development engineering. As for the equipment of the present disclosure, it is of a skid-mounted structure, is compact in structure, modular, easy to install, and highly mobile, can be applied to remote regions of overland deserts and narrow spaces on offshore platforms, has very high flexibility in operation and maintenance, and in most cases requires lower capital costs and lower energy consumption. As for a membrane separation unit of the present disclosure, a corresponding permeable gas storage tank is designed for each stage of membrane separator. Moreover, the membrane separation unit is further provided with a retained gas storage tank, and the retained gas storage tank and each stage of permeable gas storage tank are each provided with an injection port.

13 Claims, 3 Drawing Sheets

(51) Int. Cl.
  *B01D 53/30* (2006.01)
  *B01D 71/02* (2006.01)
  *E21B 43/16* (2006.01)
(52) U.S. Cl.
  CPC ......... *B01D 53/30* (2013.01); *B01D 71/0281* (2022.08); *E21B 43/164* (2013.01); *B01D 2256/10* (2013.01); *B01D 2257/504* (2013.01); *B01D 2258/0283* (2013.01)

(56) References Cited

OTHER PUBLICATIONS

Notice of Allowance of counterpart Chinese Patent Application No. 202311484737.0 issued on Jan. 9, 2024.

\* cited by examiner

SKID-MOUNTED FLUE GAS INJECTION EQUIPMENT AND METHOD WITH ADJUSTABLE $CO_2$ ENRICHMENT DEGREE

CROSS REFERENCE TO RELATED APPLICATIONS

The present application claims the benefit of Chinese Patent Application No. 2023114847370 filed on Nov. 9, 2023, the contents of which are incorporated herein by reference in their entirety.

FIELD OF THE INVENTION

The present disclosure belongs to the technical field of experimental devices for oil and gas field development engineering, and in particular, to skid-mounted flue gas injection equipment and method with an adjustable $CO_2$ enrichment degree.

BACKGROUND OF THE INVENTION

China is the fourth most common heavy oil-producing country following the United States, Canada, and Venezuela. At present, more than 70 heavy oil fields have been found in a dozen basins. Heavy oil resources account for more than 20% of total petroleum resources in China. A proved geological reserve of common heavy oil reservoirs is $20.6 \times 10^8$ t, and a predictable reserve of common heavy oil resources is $198 \times 10^8$ t. Heavy oil is recovered mainly by steam huff and puff, steam flooding, SAGD, in-situ combustion, and the like. Thermal oil recovery by steam injection is a main technology of heavy oil reservoir development in China, with an annual production of about $1600 \times 10^4$ t. However, this procedure produced a large number of flue gas emissions. The annual flue gas of a steam-injection boiler in Shengli Oilfield was emitted for $65.6 \times 10^8$ t in 2020, where the emission of $CO_2$ reached $211 \times 10^4$ t, which restricts green and low-carbon recovery of the heavy oil. At present, the application of flue gas treatment technology is restricted by high costs of laying pipe networks in a flue gas purification process used in oilfields in China, difficulties in transportation and complex geological conditions. Therefore, there is an urgent need to develop a miniaturized and modularized skid-mounted apparatus for flue gas treatment, which is suitable for various complex conditions. Resourceful utilization of flue gas generated by boilers is enabled, the steam spread range is effectively expanded, and the washing oil efficiency is improved. For a conventional $CO_2$ capture process, it often has $CO_2$ capture purity of more than 90% and high capture costs. The flue gas mainly contains 10% to 15% of $CO_2$ and 80% to 85% of $N_2$. Both gases are good gas flooding agents. Studies at home and abroad have shown that injection of nitrogen or carbon dioxide into reservoirs can effectively improve the crude oil recovery rate and the development effect. As for the effective utilization of the flue gas, it is of great significance for promoting low-carbon green development of heavy oil and carbon neutrality during oil and gas production. There is an urgent need to form a set of flue gas injection equipment in the field of oil and gas field development that transforms from $CO_2$ capture and flooding to $CO_2$ enrichment and flooding.

An apparatus and method for capturing carbon in recycled flue gas are disclosed in Chinese patent document CN105498455A, where carbon dioxide in the flue gas is captured by employing a spray tower type flue gas purification process through recycling with absorption liquid. However, after treatment with this method, the flue gas is mixed with alkali liquor, which will produce waste water containing a huge number of components such as smoke dust, oil and heavy metals. Thus, water treatment costs of a waste water treatment system are increased, and energy consumption is increased. Moreover, the overall system is large in size, so it is not suitable to be installed on complex site platforms such as mountain ridges and oceans.

A three-stage and three-section membrane separation system and method for capturing carbon dioxide in flue gas are disclosed in Chinese patent document CN112516757A, where flue gas with a low $CO_2$ content is captured by employing three-stage and three-section membrane separation. Although the apparatus is provided with a plurality of membrane separators to obtain a production gas with high $CO_2$ purity, resourceful utilization of retained gas, and flue gas of different purity is not considered. Moreover, compression costs of this design are relatively high, the membrane separation system is too complex, high-concentration $CO_2$ capture costs are high, and the service life of a membrane is low. During flue gas-assisted steam recovery of heavy oil, $N_2$ and $CO_2$ have different effects, and higher $CO_2$ purity does not mean better oil recovery. A change in the proportion of $CO_2$ in a mixed gas in different displacement stages has a significant impact on the recovery effect. Thus, such membrane separation apparatuses are difficult to be applied to oil field sites.

A CCUS system for recovering heavy oil reservoirs based on an optimal enrichment rate of $CO_2$ in flue gas and a working method thereof are disclosed in Chinese patent document CN107575190A, where $CO_2$ in the flue gas is captured by using an air separation membrane to adjust the oxygen concentration based on an oxygen-enriched combustion method. However, a separation process of the system is too complex, and an oxygen-enriched combustion boiler cannot combust under a relatively high oxygen concentration, thereby affecting the concentration of captured $CO_2$, and the apparatus cannot achieve resourceful utilization of flue gas of different purity.

SUMMARY OF THE INVENTION

In view of the deficiencies of the prior art, the present disclosure aims to provide skid-mounted flue gas injection equipment and method with an adjustable $CO_2$ enrichment degree. Compared with a conventional membrane separator, a membrane separation unit structure designed in the present disclosure can achieve both enrichment of permeable gas and recycling of retained gas. $CO_2$ in the flue gas is captured by a previous stage of membrane separator using a high-$CO_2$-permeability membrane, and a $CO_2$-enriched permeable gas enters a next stage of membrane separator through a permeable gas storage tank and a vacuum pump for purification. If the enrichment degree of flue gas $CO_2$ in the permeable gas storage tank or the enrichment degree of $N_2$ in a retained gas storage tank reaches a specified condition, both gases can directly enter a well group through an injection port, so that the nitrogen and the carbon dioxide in the flue gas can play a full role in different displacement stages, the washing oil effect of flue gas-assisted steam flooding is enhanced, and the recovery rate of the flue gas-assisted steam flooding is improved. Meanwhile, the retained gas of the previous stage of membrane separator can be recycled again by a circulation pump and stored in this stage of gas storage tank, thereby finally achieving "zero emission" of boiler flue gas.

The technical problem to be solved by the present disclosure is solved by using the following technical solutions: skid-mounted flue gas injection equipment with an adjustable $CO_2$ enrichment degree, including a flue gas pretreatment unit and a membrane separation unit connected in sequence via a pipeline;

the flue gas pretreatment unit is configured to further pressurize flue gas after dehydration of the flue gas and removal of acidic harmful gases and dust therefrom; where since flue gas flow is usually at atmospheric pressure, which is different from downhole high-pressure gas flow, in order to achieve downhole reinjection, the flue gas needs to be pressurized;

the membrane separation unit includes a first-stage membrane separator, a first-stage permeable gas storage tank, a second-stage membrane separator, a second-stage permeable gas storage tank, a third-stage membrane separator and a third-stage permeable gas storage tank connected to an outlet side of the flue gas pretreatment unit in sequence, and a retained gas storage tank connected to a retention side outlet of the first-stage membrane separator;

the retained gas storage tank is connected to a retention side of the first-stage membrane separator via a first circulation pipeline, a retention side outlet of the second-stage membrane separator and a retention side outlet of the third-stage membrane separator are connected to the retention side of the first-stage membrane separator via a second circulation pipeline and a third circulation pipeline, respectively, and the first circulation pipeline, the second circulation pipeline and the third circulation pipeline are all connected to the first-stage membrane separator through circulation pumps;

check valves are correspondingly provided between the first-stage membrane separator and the first-stage permeable gas storage tank, between the second-stage membrane separator and the second-stage permeable gas storage tank, and between the third-stage membrane separator and the third-stage permeable gas storage tank; where the check valve has a function that permeable gas enters a storage tank smoothly under the action of a pressure difference, and diffusion and backflow of the permeable gas in the storage tank are hindered;

the first circulation pipeline, the second circulation pipeline and the third circulation pipeline are each provided with a circulation control valve;

purification control valves are correspondingly provided between the flue gas pretreatment unit and the first-stage membrane separator, between the retention side outlet of the first-stage membrane separator and the retained gas storage tank, between the first-stage permeable gas storage tank and a retention side inlet of the second-stage membrane separator, and between the second-stage permeable gas storage tank and a retention side inlet of the third-stage membrane separator; the purification control valves between the retention side outlet of the first-stage membrane separator and the retained gas storage tank, between the first-stage permeable gas storage tank and the retention side inlet of the second-stage membrane separator, and between the second-stage permeable gas storage tank and the retention side inlet of the third-stage membrane separator can achieve gas exchange between the retention side and the storage tank, and the purification control valve between the flue gas pretreatment unit and the first-stage membrane separator can control compressed flue gas to enter the membrane separation unit;

the first-stage permeable gas storage tank, the second-stage permeable gas storage tank and the second-stage permeable gas storage tank are each provided with a vacuum pump; the vacuum pump vacuumizes the storage tank, which not only can avoid an impact of a non-condensed gas (air) in the storage tank on membrane separation efficiency, but also can increase an internal and external pressure difference of a permeable membrane, thereby improving the separation efficiency of the permeable membrane;

the retained gas storage tank, the first-stage permeable gas storage tank, the second-stage permeable gas storage tank and the third-stage permeable gas storage tank are each provided with a $CO_2$ component detector; and the retained gas storage tank, the first-stage permeable gas storage tank, the second-stage permeable gas storage tank and the third-stage permeable gas storage tank are provided with a retained gas injection port, a first-stage storage tank injection port, a second-stage storage tank injection port and a production gas injection port, respectively.

The first-stage membrane separator is configured to purify flue gas treated by the pretreatment unit, and the first-stage permeable gas storage tank is configured to store permeable gas from the first-stage membrane separator. The second-stage membrane separator is configured to purify gas in the first-stage permeable gas storage tank, and the second-stage permeable gas storage tank is configured to store permeable gas from the second-stage membrane separator. The third-stage membrane separator is configured to purify gas in the first-stage permeable gas storage tank, and the third-stage permeable gas storage tank is configured to store permeable gas from the third-stage membrane separator. The retained gas storage tank is configured to store retained gas of the first-stage membrane separator.

The membrane separation unit includes a first-stage membrane separator, a second-stage membrane separator and a third-stage membrane separator; and addition of next stage of membrane separators more to the membrane separation system cannot significantly increase the purity of carbon dioxide, but rather significantly increases process complexity.

A principle of separating $CO_2$ and $N_2$ by a permeable membrane is that the effectiveness of $CO_2/N_2$ separation is obtained based on the fact that the permeable membrane has different permeation rates for $CO_2$ and $N_2$, while membrane separation depends on the concentration of $CO_2$, and a membrane process is divided into two main categories:

1. when the concentration of a target component in a feed gas is relatively high, the membrane performs well in terms of membrane separation compared to other types of separation systems, enables high-purity permeation, but cannot retain low-concentration target components. For example, during capture of $CO_2$ in flue gas ($CO_2$ concentration of around 15%), the membrane is an economical option to separate a large amount of $CO_2$-containing gas, but a retentate (treated $N_2$) that meets pipeline specifications cannot be obtained thereby.

2. When the concentration of a target component in the feed gas is relatively low, the membrane can neither achieve the high-purity permeation nor low-concentration retention. In most flue gas cases, the concentration of carbon dioxide is significantly lower. In this case, a single-stage membrane cannot produce a high-quality permeate or retentate even at very high inlet pressure and/or a large membrane area.

Circulation purification using only a one-stage or two-stage membrane separator will result in higher capital expenditures (due to a large membrane area) and operating costs (due to high compression costs), such that the applicability of the membrane under such conditions of low-concentration feed is controversial. In this case, the membrane may not be a best available technology, while other separation technologies may be more competitive. The solution of the present disclosure is a combination of multiples stages of membranes, i.e., parallel connection and series connection, so that higher permeation and retention quality is achieved, and operating costs are minimized, thereby improving the overall performance of the membrane.

Therefore, the membrane separation system of the present disclosure considers resourceful utilization of retained gas, and permeable gas of different purity by a circulation purification method, rather than directly emitting the retained gas as in other patents, and the retained gas from each stage of the membrane separator can be recycled into retained gas storage tanks for utilization, thereby achieving full utilization of a boiler flue gas entering the equipment of the present disclosure, and ensuring "zero emission" of the boiler flue gas.

According to a preferred embodiment of the present disclosure, the first-stage membrane separator, the second-stage membrane separator and the third-stage membrane separator each include a separation tank and a tubular column-shaped permeable membrane provided on a middle portion of the separation tank, where the tubular column-shaped permeable membrane has a permeation side therein, and the tubular column-shaped permeable membrane and the separation tank have a retention side therebetween; and a permeation side outlet is provided at an end portion of the tubular column-shaped permeable membrane, and the separation tank is provided with a retention side outlet and a retention side inlet.

The first-stage membrane separator, the second-stage membrane separator and the third-stage membrane separator each have an inlet and two outlets (a retention side outlet and a permeation side outlet), and are provided with corresponding valves, where the inlet and the retention side outlet are located on an outer side of the tubular column-shaped permeable membrane, and the permeation side outlet is located on an inner side of the tubular column-shaped permeable membrane. The tubular column-shaped permeable membrane is cylindrical, which helps to increase a contact area and improve the membrane separation efficiency.

According to a preferred embodiment of the present disclosure, the first-stage membrane separator, the first-stage permeable gas storage tank, the second-stage membrane separator, the second-stage permeable gas storage tank, the third-stage membrane separator and the third-stage permeable gas storage tank are arranged in sequence from bottom to top. The first-stage membrane separator, the first-stage permeable gas storage tank, the second-stage membrane separator, the second-stage permeable gas storage tank, the third-stage membrane separator and the third-stage permeable gas storage tank are arranged in sequence from bottom to top, which helps to reduce the occupied area of the equipment of the present disclosure.

According to a preferred embodiment of the present disclosure, adjacent ones of the first-stage membrane separator, the first-stage permeable gas storage tank, the second-stage membrane separator, the second-stage permeable gas storage tank, the third-stage membrane separator and the third-stage permeable gas storage tank are arranged in combination to each other, and share a wall. The adjacent ones of the first-stage membrane separator, the first-stage permeable gas storage tank, the second-stage membrane separator, the second-stage permeable gas storage tank, the third-stage membrane separator and the third-stage permeable gas storage tank are arranged in combination to each other, and share a wall, which enables the whole equipment more compact, can reduce the size of the device, and can facilitate disassembly and assembly, and transportation.

According to a preferred embodiment of the present disclosure, the retained gas storage tank is provided below the first-stage membrane separator. The retained gas storage tank is provided below the first-stage membrane separator, which aims to reduce the occupied space of the equipment of the present disclosure as well, such that the overall structure is more compact.

According to a preferred embodiment of the present disclosure, the flue gas pretreatment unit includes a gas-liquid separator, a flue gas purifier and a compressor connected in sequence, where the gas-liquid separator dehydrates incoming flue gas for a feed flue gas feeding port to avoid water from contacting with acidic gases for fear of corroding the apparatus; the gas-liquid separator is connected to the flue gas purifier and the compressor in sequence; the flue gas purifier can remove acidic harmful gases (such as $SO_2$ and $H_2S$) and dust from the flue gas, and then the pretreated flue gas arrives the compressor via a pipeline and is pressurized; and the compressor is connected to the membrane separation unit.

According to a preferred embodiment of the present disclosure, an inorganic material zeolite membrane is employed for each of the first-stage membrane separator, the second-stage membrane separator and the third-stage membrane separator, where the membrane can withstand high temperature and high pressure, and is more suitable for hostile industrial conditions; and compared with polymer membranes, the inorganic material zeolite membrane has the main advantages that recovery or high temperature and superheated steam cleaning of the membrane can be achieved, and membrane contaminants can be removed using back-flushing technology, which can prolong service life. These membranes have molecular sieving properties, which guarantees gas separation conditions. In inorganic materials, pore sizes of a zeolite structure can be regulated according to composition of zeolite. The zeolite is composed of tetrahedral aluminium oxide ($AlO_4$) and silicon dioxide ($SiO_4$), and is a type of aluminosilicate (natural or synthetic) that forms a 3D porous structure within a crystal structure. Thus, the composition of the zeolite determines the pore size.

The present disclosure further discloses a skid-mounted flue gas injection method with an adjustable $CO_2$ enrichment degree, which uses the above-mentioned skid-mounted flue gas injection equipment with an adjustable $CO_2$ enrichment degree, and includes the steps of:

step 1: conveying, via a pipeline, a feed flue gas to a flue gas pretreatment unit, further pressurizing the flue gas after dehydration of the flue gas, and removal of acidic harmful gases and dust therefrom, and then conveying the pressurized flue gas to a first-stage membrane separator;

step 2: turning on a vacuum pump on a first-stage permeable gas storage tank; increasing a pressure difference between the first-stage membrane separator and the first-stage permeable gas storage tank; then opening a purification control valve between the flue gas pretreatment unit and the first-stage membrane separator and a check valve between the first-stage membrane separator and the first-stage permeable gas storage tank; making purified flue gas enter the first-stage membrane separator for separation and purification; making retained gas from the first-stage membrane separator enter a retained gas storage tank through a purification control valve between a retention side outlet of the first-stage membrane separator and the retained gas storage tank; opening a circulation control valve on a first circulation pipeline; making the retained gas in the retained gas storage tank enter, under the action of a circulation pump, the first-stage membrane separator for recycling; and making permeable gas of the first-stage membrane separator enter the first-stage permeable gas storage tank;

step 3: taking the permeable gas of the first-stage membrane separator, in the first-stage permeable gas storage tank, as a feed gas of a second-stage membrane separator; increasing a pressure difference between the second-stage membrane separator and a second-stage permeable gas storage tank by using a vacuum pump on the second-stage permeable gas storage tank; controlling a purification control valve between the first-stage permeable gas storage tank and the second-stage membrane separator, and a check valve between the second-stage membrane separator and the second-stage permeable gas storage tank to open; making the permeable gas of the first-stage membrane separator enter the second-stage membrane separator for separation and purification;

making permeable gas of the second-stage membrane separator enter the second-stage permeable gas storage tank; and making retained gas of the second-stage membrane separator return under the action of a circulation pump via a second circulation pipeline to the first-stage membrane separator for recycling to increase a capture rate of $CO_2$;

step 4: taking the permeable gas of the second-stage membrane separator, in the second-stage permeable gas storage tank, as a feed gas of a third-stage membrane separator; increasing a pressure difference between the third-stage membrane separator and a third-stage permeable gas storage tank by using a vacuum pump on the third-stage permeable gas storage tank; controlling a purification control valve between the second-stage permeable gas storage tank and the third-stage membrane separator, and a check valve between the third-stage membrane separator and the third-stage permeable gas storage tank to open; making the permeable gas of the second-stage membrane separator enter the third-stage membrane separator for separation and purification;

making permeable gas of the third-stage membrane separator enter the third-stage permeable gas storage tank; making retained gas of the third-stage membrane separator return under the action of a circulation pump via a third circulation pipeline to the first-stage membrane separator for recycling to increase a capture rate of $CO_2$;

making retained gas of the third-stage membrane separator return to the first-stage membrane separator, where the retained gas is high-purity $N_2$, and the permeable gas of the third-stage membrane separator is high-concentration $CO_2$, and is stored in the three-stage permeable gas storage tank; and step 5: detecting, by a $CO_2$ component detector, a proportion of $CO_2$ in each of the retained gas storage tank, the first-stage permeable gas storage tank, the second-stage permeable gas storage tank and the third-stage permeable gas storage tank, and when the $CO_2$ in each storage tank satisfies a set proportion, opening an injection port corresponding to a corresponding storage tank for an injection operation.

According to a preferred embodiment of the present disclosure, in step 2, operating pressure of the vacuum pump ranges from $5.5 \times 10^{-9}$ to $1.5 \times 10^{-8}$ MPa;

in step 3, operating pressure of the vacuum pump ranges from $1.5 \times 10^{-9}$ to $6.5 \times 10^{-9}$ MPa; and in step 4, operating pressure of the vacuum pump ranges from $6.5 \times 10^{-10}$ to $1.5 \times 10^{-10}$ MPa. The permeable membrane requires a pressure difference to generate a driving force and to promote mass transfer. In the present disclosure, the pressure difference between two sides of the permeable membrane can be increased by vacuumizing a retention chamber by the vacuum pump. Moreover, in order to obtain a target gas of different purity, pressure in a membrane separation apparatus also differs. Therefore, operating pressure of the vacuum pump in different membrane separation apparatuses is given in the present disclosure.

According to a preferred embodiment of the present disclosure, in step 5, enrichment concentrations of $N_2$ and $CO_2$ in the flue gas in the retained gas storage tank are 99% to 96%, and 1% to 3%, respectively;

enrichment concentrations of $CO_2$ and $N_2$ in the flue gas in the first-stage permeable gas storage tank are 41% to 52% and 38% to 47%, respectively;

enrichment concentrations of $CO_2$ and $N_2$ in the flue gas in the second-stage permeable gas storage tank are 70% to 78%, and 29% to 23%, respectively; and enrichment concentrations of $CO_2$ and $N_2$ in the flue gas in the three-stage permeable gas storage tank are 91% to 95%, and 4% to 8%, respectively.

The present disclosure has the following advantageous effects:

as for the equipment of the present disclosure, it is of a skid-mounted structure, is compact in structure, modular, easy to install, and highly mobile, can be applied to remote regions of overland deserts and narrow spaces on offshore platforms, has very high flexibility in operation and maintenance, and in most cases requires lower capital costs and lower energy consumption.

As for the membrane separation unit of the present disclosure, a corresponding permeable gas storage tank is designed for each stage of membrane separator. Moreover, the membrane separation unit is further provided with the retained gas storage tank, and the retained gas storage tank and each stage of permeable gas storage tank are each provided with the injection port. Considering the resourceful utilization of the retained gas, and the permeable gas of different purity, the retained gas of each stage of membrane separator can be recycled into the retained gas storage tank for utilization, thereby achieving the full utilization of the boiler flue gas entering the equipment of the present disclosure, and ensuring the "zero emission" of the boiler flue gas.

As for the permeable membrane separation system of the present disclosure, the pressure difference between the inner side and the outer side of the membrane of the membrane separator can be increased based on a feed flue gas compression process and a vacuumizing process, and the impact of impurities in the air in the storage tank on the membrane separation efficiency is reduced by vacuumizing the storage tank, thereby meeting $CO_2$ capture demands in different flue gas occasions.

Figure 1:
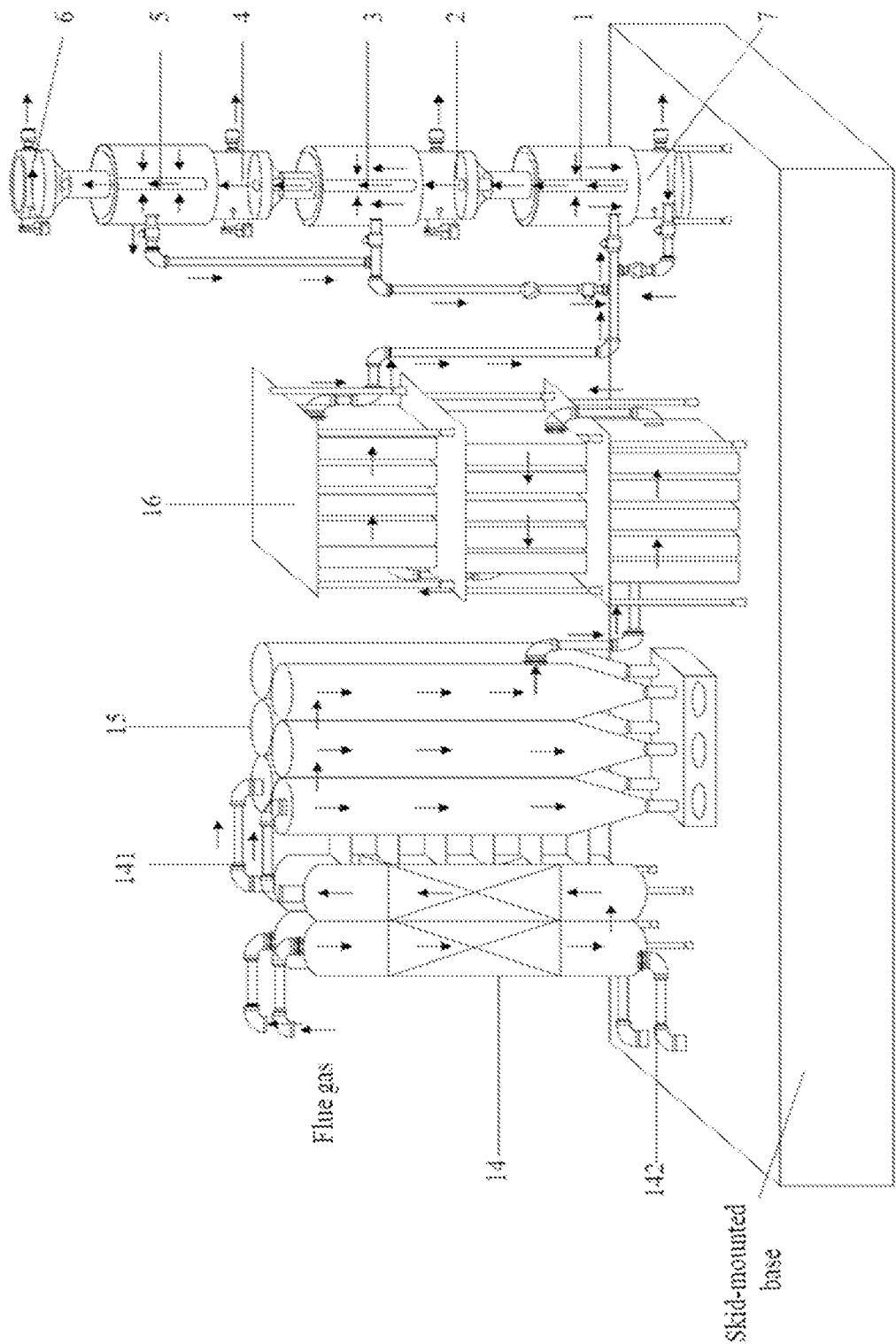
FIG. 1 is a structural schematic diagram of skid-mounted injection equipment with an adjustable $CO_2$ enrichment degree according to the present disclosure.

Reference numerals: 1—first-stage membrane separator, 2—first-stage permeable gas storage tank, 3—second-stage membrane separator, 4—second-stage permeable gas storage tank, 5—third-stage membrane separator, 6—third-stage permeable gas storage tank, and 7—retained gas storage tank;

701—first circulation pipeline, 301—second circulation pipeline, and 501—third circulation pipeline;

71—retained gas injection port, 21—first-stage storage tank injection port, 41—second-stage storage tank injection port, and 61—production gas injection port;

8—circulation pump, 9—check valve, 10—circulation control valve, 11—purification control valve, 12—vacuum pump, and 13—$CO_2$ component detector;

14—gas-liquid separator, 15—flue gas purifier, and 16—compressor;

141—exhaust port, and 142—liquid outlet; and

100—separation tank, and 200—tubular column-shaped permeable membrane.

DETAILED DESCRIPTION OF THE EMBODIMENTS

The present disclosure will now be further described with reference to the accompanying drawings and specific examples without thus limiting the present disclosure to the scope described in the embodiments.

Figure 2:
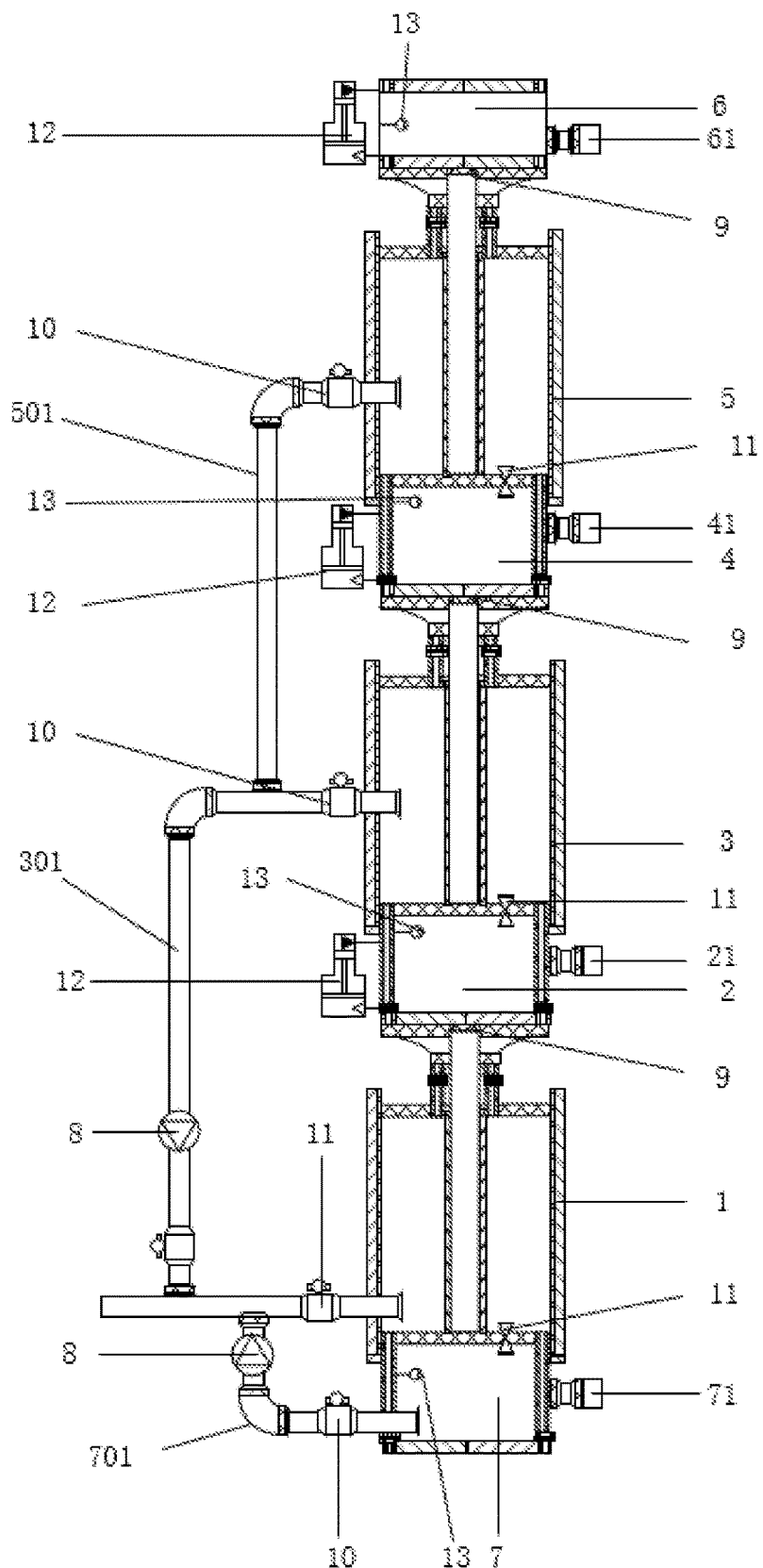
FIG. 2 is a structural schematic diagram of a membrane separation unit according to the present disclosure.

As shown in FIGS. 1 and 2, skid-mounted flue gas injection equipment with an adjustable $CO_2$ enrichment degree includes a flue gas pretreatment unit and a membrane separation unit connected in sequence via a pipeline. The flue gas pretreatment unit and the membrane separation unit are both detachably provided on a base.

The flue gas pretreatment unit is configured to further pressurize flue gas after dehydration of the flue gas and removal of acidic harmful gases and dust therefrom.

Specifically, the flue gas pretreatment unit includes a gas-liquid separator 14, a flue gas purifier 15, and a compressor 16 connected in sequence. The gas-liquid separator 14 dehydrates incoming flue gas for a feed flue gas feeding port to avoid water from contacting with acidic gases for fear of corroding the apparatus; the gas-liquid separator 14 is connected to the flue gas purifier 15 and the compressor 16 in sequence; the flue gas purifier 15 can remove the acidic harmful gases (such as $SO_2$ and $H_2S$) and the dust from the flue gas, and then the pretreated flue gas arrives the compressor 16 via a pipeline and is pressurized; and the compressor 16 is connected to the membrane separation unit. As shown in FIG. 1, a pipeline for conveying feed flue gas is firstly connected to an upper position of the gas-liquid separator 14; the interior of the gas-liquid separator 14 is of a U-shaped structure; separated flue gas is connected into an upper side of the flue gas purifier 15 via an exhaust port 141; liquid waste is discharged for treatment via a liquid outlet 142; the pipeline is led out from a bottom end of the flue gas purifier 15 to a bottom portion of the compressor 16; and after pressurizing the flue gas, the compressor 16 is connected to the first-stage membrane separator 1 through a purification control valve 11 via the pipeline led out from the upper portion.

The membrane separation unit includes a first-stage membrane separator 1, a first-stage permeable gas storage tank 2, a second-stage membrane separator 3, a second-stage permeable gas storage tank 4, a third-stage membrane separator 5 and a third-stage permeable gas storage tank 6 connected to an outlet side of the flue gas pretreatment unit in sequence, and a retained gas storage tank 7 connected to a retention side outlet of the first-stage membrane separator 1;

The retained gas storage tank 7 is connected to a retention side of the first-stage membrane separator 1 via a first circulation pipeline 701, a retention side outlet of the second-stage membrane separator 3 and a retention side outlet of the third-stage membrane separator 5 are connected to the retention side of the first-stage membrane separator 1 via a second circulation pipeline 301 and a third circulation pipeline 501, respectively, and the first circulation pipeline 701, the second circulation pipeline 301 and the third circulation pipeline 501 are all connected to the first-stage membrane separator 1 through circulation pumps 8. Specifically, the first circulation pipeline 701 uses one circulation pump 8 alone, and the second circulation pipeline 301 and the third circulation pipeline 501 share one circulation pump 8.

Check valves 9 are correspondingly provided between the first-stage membrane separator 1 and the first-stage permeable gas storage tank 2, between the second-stage membrane separator 3 and the second-stage permeable gas storage tank 4, and between the third-stage membrane separator 5 and the third-stage permeable gas storage tank 6.

The first circulation pipeline 701, the second circulation pipeline 301 and the third circulation pipeline 501 are each provided with a circulation control valve 10.

Purification control valves 11 are correspondingly provided between the flue gas pretreatment unit and the first-stage membrane separator 1, between the retention side outlet of the first-stage membrane separator 1 and the retained gas storage tank 7, between the first-stage permeable gas storage tank 2 and a retention side inlet of the second-stage membrane separator 3, and between the second-stage permeable gas storage tank 4 and a retention side inlet of the third-stage membrane separator 5.

The first-stage permeable gas storage tank 2, the second-stage permeable gas storage tank 4 and the second-stage permeable gas storage tank 6 are each provided with a vacuum pump 12.

The retained gas storage tank 7, the first-stage permeable gas storage tank 2, the second-stage permeable gas storage tank 4 and the third-stage permeable gas storage tank 6 are each provided with a $CO_2$ component detector 13.

The retained gas storage tank 7, the first-stage permeable gas storage tank 2, the second-stage permeable gas storage tank 4 and the third-stage permeable gas storage tank 6 are provided with a retained gas injection port 71, a first-stage storage tank injection port 21, a second-stage storage tank injection port 41 and a production gas injection port 61, respectively.

Figure 3:
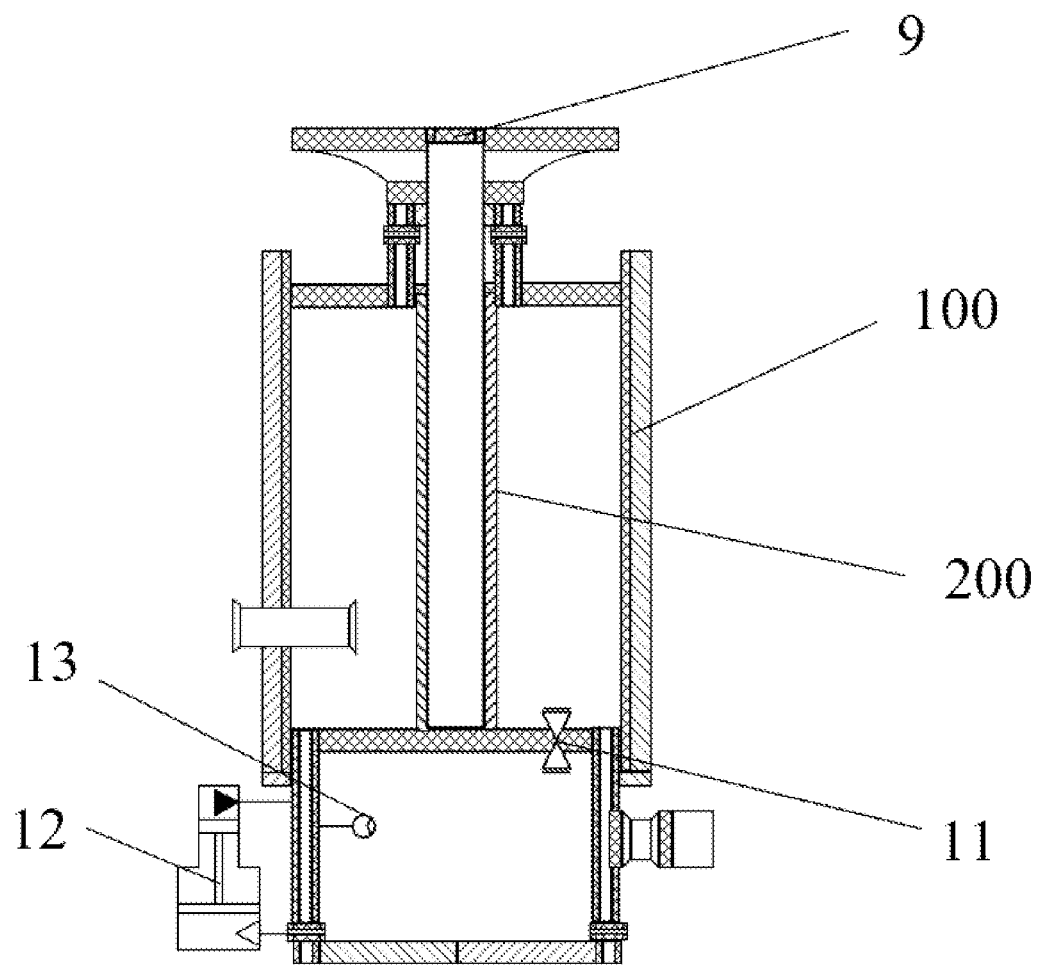
FIG. 3 is a structural schematic diagram of a second-stage membrane separator according to the present disclosure.

As shown in FIG. 3, the first-stage membrane separator 1, the second-stage membrane separator 3 and the third-stage membrane separator 5 each include a separation tank 100 and a tubular column-shaped permeable membrane 200 provided on a middle portion of the separation tank, where the tubular column-shaped permeable membrane 200 has a permeation side therein, and the tubular column-shaped permeable membrane 200 and the separation tank 100 have a retention side therebetween.

Specifically, the separation tank 100 and the tubular column-shaped permeable membrane 200 are arranged coaxially, the tubular column-shaped permeable membrane 200 is located on an inner side of the separation tank 100, and the separation tank 100 is also cylindrical.

A permeation side outlet is provided at an end portion of the tubular column-shaped permeable membrane 200, the separation tank 100 is provided with a retention side outlet and a retention side inlet, and the check valve 9 is provided at the permeation side outlet.

The first-stage membrane separator 1, the first-stage permeable gas storage tank 2, the second-stage membrane separator 3, the second-stage permeable gas storage tank 4, the third-stage membrane separator 5 and the third-stage permeable gas storage tank 6 are arranged in sequence from bottom to top.

Adjacent ones of the first-stage membrane separator 1, the first-stage permeable gas storage tank 2, the second-stage membrane separator 3, the second-stage permeable gas storage tank 4, the third-stage membrane separator 5 and the third-stage permeable gas storage tank 6 are arranged in combination to each other, and share a wall. Specifically, for example, as shown in FIG. 2, a top portion of the first-stage permeable gas storage tank 2 and a bottom portion of the second-stage membrane separator 3 share a partition.

The retained gas storage tank 7 is provided below the first-stage membrane separator 1. The retained gas storage tank 7 and the first-stage membrane separator 1 are also connected in combination, and a top portion of the retained gas storage tank 7 and a bottom portion of the first-stage membrane separator 1 share a same partition.

An SAPO-34 zeolite membrane is employed for each of the first-stage membrane separator 1, the second-stage membrane separator 3 and the third-stage membrane separator 5, where the membrane has a pore size of 0.38 nm, and pore sizes of SAPO-34 zeolite allow separation of gases with a similar kinetic diameter. $CO_2$ (0.330 nm) or $N_2$ (0.364 nm) can be separated from $CH_4$ (0.374 nm) by size exclusion, and the $CO_2$ flows at a higher rate than the $N_2$, thereby achieving enrichment of the $CO_2$.

A skid-mounted flue gas injection method with an adjustable $CO_2$ enrichment degree includes the steps of:

step 1: conveying, via a pipeline, feed flue gas to a flue gas pretreatment unit, further pressurizing the flue gas after dehydration of the flue gas, and removal of acidic harmful gases and dust therefrom, and then conveying the pressurized flue gas to a first-stage membrane separator 1;

step 2: turning on a vacuum pump 12 on a first-stage permeable gas storage tank 2; increasing a pressure difference between the first-stage membrane separator 1 and the first-stage permeable gas storage tank 2; then opening a purification control valve 11 between the flue gas pretreatment unit and the first-stage membrane separator 1 and a check valve 9 between the first-stage membrane separator 1 and the first-stage permeable gas storage tank 2; making purified flue gas enter the first-stage membrane separator 1 for separation and purification; making retained gas of the first-stage membrane separator 1 enter a retained gas storage tank 7 through a purification control valve 11 between a retention side outlet of the first-stage membrane separator 1 and the retained gas storage tank 7; opening a circulation control valve 10 on a first circulation pipeline 701; making the retained gas in the retained gas storage tank 7 enter, under the action of a circulation pump 8, the first-stage membrane separator 1 for recycling; and making permeable gas of the first-stage membrane separator 1 enter the first-stage permeable gas storage tank 2;

step 3: taking the permeable gas of the first-stage membrane separator 1, in the first-stage permeable gas storage tank 2, as a feed gas of a second-stage membrane separator 3; increasing a pressure difference between the second-stage membrane separator 3 and a second-stage permeable gas storage tank 4 by using a vacuum pump 12 on the second-stage permeable gas storage tank 4; controlling a purification control valve 11 between the first-stage permeable gas storage tank 2 and the second-stage membrane separator 3, and a check valve 9 between the second-stage membrane separator 3 and the second-stage permeable gas storage tank 4 to open; making the permeable gas of the first-stage membrane separator 1 enter the second-stage membrane separator 3 for separation and purification; making permeable gas of the second-stage membrane separator 3 enter the second-stage permeable gas storage tank 4; and making retained gas of the second-stage membrane separator 3 return under the action of a circulation pump 8 via a second circulation pipeline 301 to the first-stage membrane separator 1 for recycling to increase a capture rate of $CO_2$.

step 4: taking the permeable gas of the second-stage membrane separator 3, in the second-stage permeable gas storage tank 4, as a feed gas of a third-stage membrane separator 5; increasing a pressure difference between the third-stage membrane separator 5 and a third-stage permeable gas storage tank 6 by using a vacuum pump 12 on the third-stage permeable gas storage tank 6; controlling a purification control valve 11 between the second-stage permeable gas storage tank 4 and the third-stage membrane separator 5, and a check valve 9 between the third-stage membrane separator 5 and the third-stage permeable gas storage tank 6 to open; making the permeable gas of the second-stage membrane separator 3 enter the third-stage membrane separator 5 for separation and purification; making permeable gas of the third-stage membrane separator 5 enter the third-stage permeable gas storage tank 6; making retained gas of the third-stage membrane separator 5 return under the action of a circulation pump 8 via a third circulation pipeline 501 to the first-stage membrane separator 1 for recycling to increase a capture rate of $CO_2$; and making the retained gas of the third-stage membrane separator 5 return to the first-stage membrane separator 1, where the retained gas is high-purity $N_2$, and the permeable gas of the third-stage membrane separator 5 is high-concentration $CO_2$, and is stored in the three-stage permeable gas storage tank 6; and step 5: detecting, by a $CO_2$ component detector 13, a proportion of $CO_2$ in each of the retained gas storage tank 7, the first-stage permeable gas storage tank 2, the second-stage permeable gas storage tank 4 and the third-stage permeable gas storage tank 6, and when the $CO_2$ in each storage tank satisfies a set proportion, opening an injection port corresponding to a corresponding storage tank for an injection operation.

In step 2, operating pressure of the vacuum pump 12 ranges from $5.5 \times 10^{-9}$ to $1.5 \times 10^{-8}$ MPa.

In step 3, operating pressure of the vacuum pump 12 ranges from $1.5 \times 10^{-9}$ to $6.5 \times 10^{-9}$ MPa.

In step 4, operating pressure of the vacuum pump 12 ranges from $6.5 \times 10^{-10}$ to $1.5 \times 10^{-10}$ MPa.

As for the above-mentioned separation and purification procedure, it can be performed in the first-stage membrane separator 1, the second-stage membrane separator 3 and the third-stage membrane separator 5 in sequence, and the purification can be repeated for multiple times. By the above-mentioned purification, enrichment concentrations of $N_2$ and $CO_2$ in the flue gas in the retained gas storage tank 7 are 96% to 93%, and 3% to 7%, respectively.

Enrichment concentrations of $CO_2$ and $N_2$ in the flue gas in the first-stage permeable gas storage tank 2 are 41% to 52% and 38% to 47%, respectively.

Enrichment concentrations of $CO_2$ and $N_2$ in the flue gas in the second-stage permeable gas storage tank 4 are 70% to 78%, and 29% to 23%, respectively.

Enrichment concentrations of $CO_2$ and $N_2$ in the flue gas in the three-stage permeable gas storage tank 6 are 91% to 95%, and 4% to 8%, respectively.

Embodiment 1

Taking a block X1 in Shengli Oilfield as an example, flue gas-assisted steam recovery of heavy oil is mainly employed in this block, and the annual emission of flue gas is $47.6 \times 10^6$ t, where the content of $CO_2$ is 15%. The skid-mounted equipment of the present disclosure is connected to an exhaust port of a steam boiler.

In step 1, feed flue gas is conveyed to a gas-liquid separator 14 via a pipeline, where the concentration of $CO_2$ in the feed flue gas in this embodiment is 15%, separated flue gas enters a flue gas purifier 15 through an exhaust port 141 of the gas-liquid separator 14, and is pretreated in the flue gas purifier 15 to remove harmful impurities such as $NO_X$ and $SO_X$, and dust particle solid impurities, and after pressurizing the pretreated flue gas, a compressor 16 is connected to the first-stage membrane separator 1.

In step 2, a vacuum pump 12 on a first-stage permeable gas storage tank 2 is turned on, operating pressure of the vacuum pump 12 is set as $1.5 \times 10^{-8}$ MPa, such that a pressure difference between two sides of a membrane of the first-stage membrane separator 1 rises to increase a mass transfer driving force; a purification control valve 11 between a flue gas pretreatment unit and the first-stage membrane separator 1 is opened, purified flue gas enters the first-stage membrane separator 1 for separation and purification; retained gas of the first-stage membrane separator 1 enters a retained gas storage tank 7 through the purification control valve 11 between a retention side outlet of the first-stage membrane separator 1 and the retained gas storage tank 7; the retained gas in the retained gas storage tank 7 can be made return under the action of a circulation pump 8 via a first circulation pipeline 701 to the first-stage membrane separator 1 for recycling; and permeable gas of the first-stage membrane separator 1 enters the first-stage permeable gas storage tank 2.

In step 3, the permeable gas of the first-stage membrane separator 1, in the first-stage permeable gas storage tank 2, is taken as a feed gas of a second-stage membrane separator 3; a vacuum pump 12 on a second-stage permeable gas storage tank 4 is turned on, operating pressure of the vacuum pump 12 is set as $6.5 \times 10^{-9}$ MPa, such that a pressure difference between a permeation side and a retention side of the second-stage membrane separator 3 rises; a purification control valve 11 between the first-stage permeable gas storage tank 2 and the second-stage membrane separator 3 is controlled to open; the permeable gas of the first-stage membrane separator 1 enters the second-stage membrane separator 3 for separation and purification;

permeable gas of the second-stage membrane separator 3 enters the second-stage permeable gas storage tank 4; and retained gas of the second-stage membrane separator 3 returns under the action of a circulation pump 8 via a second circulation pipeline 301 to the first-stage membrane separator 1 for recycling to increase a capture rate of $CO_2$.

In step 4, the permeable gas of the second-stage membrane separator 3, in the second-stage permeable gas storage tank 4, is taken as a feed gas of a third-stage membrane separator 5, a vacuum pump 12 on a third-stage permeable gas storage tank 6 is turned on, operating pressure of the vacuum pump 12 is set as $1.5 \times 10^{-10}$ MPa, such that the permeation side of the third-stage membrane separator 3 is under vacuum; a purification control valve 11 between the second-stage permeable gas storage tank 4 and the third-stage membrane separator 5 is controlled to open; the permeable gas of the second-stage membrane separator 3 enters the third-stage membrane separator 5 for separation and purification;

permeable gas of the third-stage membrane separator 5 enters the third-stage permeable gas storage tank 6; retained gas of the third-stage membrane separator 5 returns under the action of a circulation pump 8 via a third circulation pipeline 501 to the first-stage membrane separator 1 for recycling to increase a capture rate of $CO_2$; and the retained gas of the third-stage membrane separator 5 returns to the first-stage membrane separator 1, where the retained gas is high-purity $N_2$, and the permeable gas of the third-stage membrane separator 5 is high-concentration $CO_2$, and is stored in the three-stage permeable gas storage tank 6.

In step 5, after 12 h of stable operation, readings of $CO_2$ component detectors 13 in the retained gas storage tank 7, the first-stage permeable gas storage tank 2, the second-stage permeable gas storage tank 4 and the third-stage permeable gas storage tank 6 are recorded, respectively, and the test results are shown in Table 1.

Embodiment 2

Taking a block X2 in Shengli Oilfield as an example, flue gas-assisted steam recovery of heavy oil is employed, and the annual emission of flue gas is $47.6 \times 10^6$ t, where the content of $CO_2$ is 20%. The skid-mounted equipment of the present disclosure is connected to $N_2$ membrane separation and $CO_2$ membrane separation exhaust ports of a steam boiler.

In step 1, feed flue gas is conveyed to a gas-liquid separator 14 via a pipeline, where the concentration of $CO_2$ in the feed flue gas in this embodiment is 20%, separated flue gas enters a flue gas purifier 15 through an exhaust port 141 of the gas-liquid separator 14, and is pretreated in the flue gas purifier 15 to remove harmful impurities such as $NO_X$ and $SO_X$, and dust particle solid impurities, and after pressurizing the pretreated flue gas, a compressor 16 is connected to the first-stage membrane separator 1.

In step 2, a vacuum pump 12 on a first-stage permeable gas storage tank 2 is turned on, operating pressure of the vacuum pump 12 is set as $1.5 \times 10^{-8}$ MPa, such that a pressure difference between two sides of a membrane of the first-stage membrane separator 1 rises to increase a mass transfer driving force; a purification control valve 11 between a flue gas pretreatment unit and the first-stage membrane separator 1 is opened, purified flue gas enters the first-stage membrane separator 1 for separation and purification; retained gas of the first-stage membrane separator 1 enters a retained gas storage tank 7 through the purification control valve 11 between a retention side outlet of the first-stage membrane separator 1 and the retained gas storage tank 7; the retained gas in the retained gas storage tank 7 can be made return under the action of a circulation pump 8 via a first circulation pipeline 701 to the first-stage membrane separator 1 for recycling; and permeable gas of the first-stage membrane separator 1 enters the first-stage permeable gas storage tank 2.

In step 3, the permeable gas of the first-stage membrane separator 1, in the first-stage permeable gas storage tank 2, is taken as a feed gas of a second-stage membrane separator 3; a vacuum pump 12 on a second-stage permeable gas storage tank 4 is turned on, operating pressure of the vacuum pump 12 is set as $6.5 \times 10^{-9}$ MPa, such that a pressure difference between a permeation side and a retention side of the second-stage membrane separator 3 rises; a purification control valve 11 between the first-stage permeable gas storage tank 2 and the second-stage membrane separator 3 is controlled to open; the permeable gas of the first-stage membrane separator 1 enters the second-stage membrane separator 3 for separation and purification;

permeable gas of the second-stage membrane separator 3 enters the second-stage permeable gas storage tank 4; and retained gas of the second-stage membrane separator 3 returns under the action of a circulation pump 8 via a second circulation pipeline 301 to the first-stage membrane separator 1 for recycling to increase a capture rate of $CO_2$.

In step 4, the permeable gas of the second-stage membrane separator 3, in the second-stage permeable gas storage tank 4, is taken as a feed gas of a third-stage membrane separator 5, a vacuum pump 12 on a third-stage permeable gas storage tank 6 is turned on, operating pressure of the vacuum pump 12 is set as $1.5 \times 10^{-10}$ MPa, such that the permeation side of the third-stage membrane separator 3 is under vacuum; a purification control valve 11 between the second-stage permeable gas storage tank 4 and the third-stage membrane separator 5 is controlled to open; the permeable gas of the second-stage membrane separator 3 enters the third-stage membrane separator 5 for separation and purification;

permeable gas of the third-stage membrane separator 5 enters the third-stage permeable gas storage tank 6; retained gas of the third-stage membrane separator 5 returns under the action of a circulation pump 8 via a third circulation pipeline 501 to the first-stage membrane separator 1 for recycling to increase a capture rate of $CO_2$; and the retained gas of the third-stage membrane separator 5 returns to the first-stage membrane separator 1, where the retained gas is high-purity $N_2$, and the permeable gas of the third-stage membrane separator 5 is high-concentration $CO_2$, and is stored in the three-stage permeable gas storage tank 6.

In step 5, after 12 h of stable operation, readings of $CO_2$ component detectors 13 in the retained gas storage tank 7, the first-stage permeable gas storage tank 2, the second-stage permeable gas storage tank 4 and the third-stage permeable gas storage tank 6 are recorded, respectively, and the test results are shown in Table 1.

TABLE 1

| | Embodiment 1 | Embodiment 2 |
|---|---|---|
| Concentration (%) of $CO_2$ in feed flue gas | 15 | 20 |
| Capture rate (%) of $CO_2$ | 89.1 | 91.3 |
| Concentration % of $CO_2$ in retained gas storage tank | 2.2 | 2.6 |
| Concentration % of $CO_2$ in first-stage permeable gas storage tank | 44.5 | 49.2 |
| Concentration % of $CO_2$ in second-stage permeable gas storage tank | 73.3 | 77.6 |
| Concentration % of $CO_2$ in third-stage permeable gas storage tank | 91.5 | 94.9 |

As shown by the data in Table 1, by using the skid-mounted flue gas injection equipment and method with an adjustable $CO_2$ enrichment degree of the present disclosure, it is possible to achieve high purification of both $CO_2$ and $N_2$ in the flue gas, with both purity reaching 90% or above, and a $CO_2$ and $N_2$ mixed gas in an intermediate proportion can be obtained. Since a change in the proportion of the $CO_2$ in the mixed gas in different displacement stages has a significant impact on the recovery effect, if the enrichment degree of flue gas $CO_2$ in the $CO_2$ and $N_2$ mixed gas in the intermediate proportion reaches a specified condition, the mixed gas can directly enter a well group through an injection port, so that the nitrogen and the carbon dioxide in the flue gas can play a full role in different displacement stages, the washing oil effect of flue gas-assisted steam flooding is enhanced, and the recovery rate of the flue gas-assisted steam flooding is improved.

The invention claimed is:

1. A skid-mounted flue gas injection equipment with an adjustable $CO_2$ enrichment degree, comprising a flue gas pretreatment unit and a membrane separation unit connected in sequence via a pipeline;

the flue gas pretreatment unit is configured to further pressurize flue gas after dehydration of the flue gas and removal of acidic harmful gases and dust therefrom;

the membrane separation unit comprises a first-stage membrane separator (1), a first-stage permeable gas storage tank (2), a second-stage membrane separator (3), a second-stage permeable gas storage tank (4), a third-stage membrane separator (5) and a third-stage permeable gas storage tank (6) connected to an outlet side of the flue gas pretreatment unit in sequence, and a retained gas storage tank (7) connected to a retention side outlet of the first-stage membrane separator (1);

the retained gas storage tank (7) is connected to a retention side of the first-stage membrane separator (1) via a first circulation pipeline (701), a retention side outlet of the second-stage membrane separator (3) and a retention side outlet of the third-stage membrane separator (5) are connected to the retention side of the first-stage membrane separator (1) via a second circulation pipeline (301) and a third circulation pipeline (501), respectively, and the first circulation pipeline (701), the second circulation pipeline (301) and the third circulation pipeline (501) are all connected to the first-stage membrane separator (1) through circulation pumps (8);

check valves (9) are correspondingly provided between the first-stage membrane separator (1) and the first-stage permeable gas storage tank (2), between the second-stage membrane separator (3) and the second-stage permeable gas storage tank (4), and between the third-stage membrane separator (5) and the third-stage permeable gas storage tank (6);

the first circulation pipeline (701), the second circulation pipeline (301) and the third circulation pipeline (501) are each provided with a circulation control valve (10);

purification control valves (11) are correspondingly provided between the flue gas pretreatment unit and the first-stage membrane separator (1), between the retention side outlet of the first-stage membrane separator (1) and the retained gas storage tank (7), between the first-stage permeable gas storage tank (2) and a retention side inlet of the second-stage membrane separator (3), and between the second-stage permeable gas storage tank (4) and a retention side inlet of the third-stage membrane separator (5);

the first-stage permeable gas storage tank (2), the second-stage permeable gas storage tank (4) and the second-stage permeable gas storage tank (6) are each provided with a vacuum pump (12);

the retained gas storage tank (7), the first-stage permeable gas storage tank (2), the second-stage permeable gas storage tank (4) and the third-stage permeable gas storage tank (6) are each provided with a $CO_2$ component detector (13); and the retained gas storage tank (7), the first-stage permeable gas storage tank (2), the second-stage permeable gas storage tank (4) and the third-stage permeable gas storage tank (6) are provided with a retained gas injection port (71), a first-stage storage tank injection port (21), a second-stage storage tank injection port (41) and a production gas injection port (61), respectively.

2. The skid-mounted flue gas injection equipment with an adjustable $CO_2$ enrichment degree according to claim 1, wherein the first-stage membrane separator (1), the second-stage membrane separator (3) and the third-stage membrane separator (5) each comprise a separation tank (100) and a tubular column-shaped permeable membrane (200) provided on a middle portion of the separation tank, the tubular column-shaped permeable membrane (200) having a permeation side therein, and the tubular column-shaped permeable membrane (200) and the separation tank (100) having a retention side therebetween; and a permeation side outlet is provided at an end portion of the tubular column-shaped permeable membrane (200), and the separation tank (100) is provided with a retention side outlet and a retention side inlet.

3. The skid-mounted flue gas injection equipment with an adjustable $CO_2$ enrichment degree according to claim 1, wherein the first-stage membrane separator (1), the first-stage permeable gas storage tank (2), the second-stage membrane separator (3), the second-stage permeable gas storage tank (4), the third-stage membrane separator (5) and the third-stage permeable gas storage tank (6) are arranged in sequence from bottom to top.

4. The skid-mounted flue gas injection equipment with an adjustable $CO_2$ enrichment degree according to claim 3, wherein adjacent ones of the first-stage membrane separator (1), the first-stage permeable gas storage tank (2), the second-stage membrane separator (3), the second-stage permeable gas storage tank (4), the third-stage membrane separator (5) and the third-stage permeable gas storage tank (6) are arranged in combination to each other, and share a wall.

5. The skid-mounted flue gas injection equipment with an adjustable $CO_2$ enrichment degree according to claim 3, wherein the retained gas storage tank (7) is provided below the first-stage membrane separator (1).

6. The skid-mounted flue gas injection equipment with an adjustable $CO_2$ enrichment degree according to claim 2, wherein the first-stage membrane separator (1), the first-stage permeable gas storage tank (2), the second-stage membrane separator (3), the second-stage permeable gas storage tank (4), the third-stage membrane separator (5) and the third-stage permeable gas storage tank (6) are arranged in sequence from bottom to top.

7. The skid-mounted flue gas injection equipment with an adjustable $CO_2$ enrichment degree according to claim 6, wherein adjacent ones of the first-stage membrane separator (1), the first-stage permeable gas storage tank (2), the second-stage membrane separator (3), the second-stage permeable gas storage tank (4), the third-stage membrane separator (5) and the third-stage permeable gas storage tank (6) are arranged in combination to each other, and share a wall.

8. The skid-mounted flue gas injection equipment with an adjustable $CO_2$ enrichment degree according to claim 6, wherein the retained gas storage tank (7) is provided below the first-stage membrane separator (1).

9. The skid-mounted flue gas injection equipment with an adjustable $CO_2$ enrichment degree according to claim 1, wherein the flue gas pretreatment unit comprises a gas-liquid separator (14), a flue gas purifier (15) and a compressor (16) connected in sequence.

10. The skid-mounted flue gas injection equipment with an adjustable $CO_2$ enrichment degree according to claim 1, wherein an inorganic material zeolite membrane is employed as a permeable membrane of each of the first-stage membrane separator (1), the second-stage membrane separator (3) and the third-stage membrane separator (5).

11. A skid-mounted flue gas injection method with an adjustable $CO_2$ enrichment degree, comprising the steps of:

step 1: conveying, via a pipeline, feed flue gas to a flue gas pretreatment unit, further pressurizing the flue gas after dehydration of the flue gas, and removal of acidic harmful gases and dust therefrom, and then conveying the pressurized flue gas to a first-stage membrane separator (1);

step 2: turning on a vacuum pump (12) on a first-stage permeable gas storage tank (2), increasing a pressure difference between the first-stage membrane separator (1) and the first-stage permeable gas storage tank (2), then opening a purification control valve (11) between the flue gas pretreatment unit and the first-stage membrane separator (1) and a check valve (9) between the first-stage membrane separator (1) and the first-stage permeable gas storage tank (2), making purified flue gas enter the first-stage membrane separator (1) for separation and purification, making retained gas of the first-stage membrane separator (1) enter a retained gas storage tank (7) through a purification control valve (11) between a retention side outlet of the first-stage membrane separator (1) and the retained gas storage tank (7), opening a circulation control valve (10) on a first circulation pipeline (701), making the retained gas in the retained gas storage tank (7) enter, under the action of a circulation pump (8), the first-stage membrane separator (1) for recycling, and making permeable gas of the first-stage membrane separator (1) enter the first-stage permeable gas storage tank (2);

step 3: taking the permeable gas of the first-stage membrane separator (1), in the first-stage permeable gas storage tank (2), as a feed gas of a second-stage membrane separator (3); increasing a pressure difference between the second-stage membrane separator (3) and a second-stage permeable gas storage tank (4) by using a vacuum pump (12) on the second-stage permeable gas storage tank (4); controlling a purification control valve (11) between the first-stage permeable gas storage tank (2) and the second-stage membrane separator (3), and a check valve (9) between the second-stage membrane separator (3) and the second-stage permeable gas storage tank (4) to open; making the permeable gas of the first-stage membrane separator (1) enter the second-stage membrane separator (3) for separation and purification;

making permeable gas of the second-stage membrane separator (3) enter the second-stage permeable gas storage tank (4); and making retained gas of the second-stage membrane separator (3) return under the action of a circulation pump (8) via a second circulation pipeline (301) to the first-stage membrane separator (1) for recycling to increase a capture rate of $CO_2$;

step 4: taking the permeable gas of the second-stage membrane separator (3), in the second-stage permeable gas storage tank (4), as a feed gas of a third-stage membrane separator (5); increasing a pressure difference between the third-stage membrane separator (5) and a third-stage permeable gas storage tank (6) by using a vacuum pump (12) on the third-stage permeable gas storage tank (6); controlling a purification control valve (11) between the second-stage permeable gas storage tank (4) and the third-stage membrane separator (5), and a check valve (9) between the third-stage membrane separator (5) and the third-stage permeable gas storage tank (6) to open; making the permeable gas of the second-stage membrane separator (3) enter the third-stage membrane separator (5) for separation and purification;

making permeable gas of the third-stage membrane separator (5) enter the third-stage permeable gas storage tank (6); and making retained gas of the third-stage membrane separator (5) return under the action of a circulation pump (8) via a third circulation pipeline (501) to the first-stage membrane separator (1) for recycling to increase a capture rate of $CO_2$; and step 5: detecting, by a $CO_2$ component detector (13), a proportion of $CO_2$ in each of the retained gas storage tank (7), the first-stage permeable gas storage tank (2), the second-stage permeable gas storage tank (4) and the third-stage permeable gas storage tank (6), and when the $CO_2$ in each storage tank satisfies a set proportion, opening an injection port corresponding to a corresponding storage tank for an injection operation.

12. The skid-mounted flue gas injection method with an adjustable $CO_2$ enrichment degree according to claim 11, wherein in step 2, operating pressure of the vacuum pump (12) ranges from $5.5 \times 10^{-9}$ to $1.5 \times 10^{-8}$ MPa;

in step 3, operating pressure of the vacuum pump (12) ranges from $1.5 \times 10^{-9}$ to $6.5 \times 10^{-9}$ MPa; and in step 4, operating pressure of the vacuum pump (12) ranges from $6.5 \times 10^{-10}$ to $1.5 \times 10^{-10}$ MPa.

13. The skid-mounted flue gas injection method with an adjustable $CO_2$ enrichment degree according to claim 11, wherein in step 5, enrichment concentrations of $N_2$ and $CO_2$ in the flue gas in the retained gas storage tank (7) are 96% to 93%, and 3% to 7%, respectively;

enrichment concentrations of $CO_2$ and $N_2$ in the flue gas in the first-stage permeable gas storage tank (2) are 41% to 52% and 38% to 47%, respectively;

enrichment concentrations of $CO_2$ and $N_2$ in the flue gas in the second-stage permeable gas storage tank (4) are 70% to 78%, and 29% to 23%, respectively; and enrichment concentrations of $CO_2$ and $N_2$ in the flue gas in the three-stage permeable gas storage tank (6) are 91% to 95%, and 4% to 8%, respectively.

\* \* \* \* \*